(12) United States Patent
Lecheler-Moore et al.

(10) Patent No.: US 7,143,099 B2
(45) Date of Patent: Nov. 28, 2006

(54) HISTORICAL DATA WAREHOUSING SYSTEM

(75) Inventors: Ruth Lecheler-Moore, Rancho Murieta, CA (US); Tom Serio, Davis, CA (US); Kirven Dunham, Rancho Cordova, CA (US); Larry T. Riggs, Roseville, CA (US)

(73) Assignee: Amdocs Software Systems Limited, Dublin (IE)

( * ) Notice: Subject to any disclaimer, the term of this patent is extended or adjusted under 35 U.S.C. 154(b) by 1134 days.

(21) Appl. No.: 09/780,123

(22) Filed: Feb. 8, 2001
(Under 37 CFR 1.47)

(65) Prior Publication Data

US 2003/0014335 A1     Jan. 16, 2003

(51) Int. Cl.
*G06F 7/00*     (2006.01)
*G06F 17/00*    (2006.01)

(52) U.S. Cl. .................. 707/101; 707/102; 707/103 R; 707/104.1

(58) Field of Classification Search .................. 707/10, 707/103, 3, 101, 102, 103 R, 104.1
See application file for complete search history.

(56) References Cited

U.S. PATENT DOCUMENTS

| | | | |
|---|---|---|---|
| 5,381,332 A | 1/1995 | Wood | |
| 5,515,098 A | 5/1996 | Carles | |
| 5,696,906 A | 12/1997 | Peters et al. | |
| 5,765,142 A | 6/1998 | Allred et al. | |
| 5,799,286 A | 8/1998 | Morgan et al. | |
| 5,822,410 A | 10/1998 | McCausland et al. | |
| 5,884,284 A | 3/1999 | Peters et al. | |
| 6,138,121 A * | 10/2000 | Costa et al. | 707/100 |
| 6,385,604 B1 * | 5/2002 | Bakalash et al. | 707/3 |
| 6,510,432 B1 * | 1/2003 | Doyle | 707/10 |
| 6,587,857 B1 * | 7/2003 | Carothers et al. | 707/102 |
| 6,714,945 B1 * | 3/2004 | Foote et al. | 707/104.1 |
| 6,892,210 B1 * | 5/2005 | Erickson et al. | 707/201 |
| 2002/0016771 A1 * | 2/2002 | Carothers et al. | 705/43 |
| 2003/0225736 A1 * | 12/2003 | Bakalash et al. | 707/1 |

* cited by examiner

*Primary Examiner*—Don Wong
*Assistant Examiner*—Thanh-Ha Dang
(74) *Attorney, Agent, or Firm*—Zilka-Kotab, PC

(57) ABSTRACT

Utilizing change data capture methodology, a computer facilitated historical data warehousing system accepts transactional/operational data having no directly tied dates from a legacy source system and processes that data into a subject-oriented format that is optimized for analytical and query reports via a two step process comprised of pre-processing and transforming. The pre-processing step entails a serial modification of data with only the last modification being recorded. The transforming step involves linking related data by utilizing reusable primary keys and dates obtained from an RDBMS in an operation system of the legacy source system that supplied the transactional/operational data.

16 Claims, 7 Drawing Sheets

HISTORICAL DATA WAREHOUSING SYSTEM

BACKGROUND OF THE INVENTION

1. Field of the Invention

A data warehousing system is described in which transactionally related operational data is date/timestamped, processed, and stored in an historical data warehouse in a subject-oriented form suitable for easy manipulation and analysis by a user. More specifically, a computer controlled data warehousing system is disclosed whereby original operational data is collected, via a change data capture technique, and processed in a two-step procedure in a dynamic fashion, wherein the operational data is first preprocessed and then transformed to generate data in a subject-oriented format that permits a user to easily and creatively utilize the subject-oriented data in useful and non-expected ways.

2. Description of the Background Art

Existing OLTP or revenue generating systems contain programming that permits a computer to simultaneously handle revenue generating activities and report generating processes. Such duel programmed systems are inherently restricted in their efficiency by being burdened with two functions that are coupled too closely in the processing scheme. Additionally, the existing systems store data in data warehouses that contain all of the raw, original, or operational data in a non-dynamic form (i.e.: the stored operational data is not continually updated in a dynamic fashion to contain date/timestamped information (past and current information) and the stored operational data contains all of the input information in a form that is not easily accessed by a user, thereby preventing easily created novel applications). A user tapping into such an existing system to collect desired information from the operational data must first construct a program(s) that extracts the bits and pieces of information that are of particular interest from the remaining operational data. Each time this "programming" step occurs, time, effort, and money are required. Traditional operational data contains no "analytical" transformation that allows the user to easily access virtually any desired information without the need of additional programming and wasted time and effort.

In particular, U.S. Pat. No. 5,381,332 describes a project management system that includes automated schedule and cost integration. The system automatically bridges a conventional network scheduling tool and a conventional performance measurement tool. Common data is formatted with properties for use by both tools. The data stored in each tool is kept consistent to prevent multiple entries and unnecessary revisions.

U.S. Pat. No. 5,515,098 discloses a system and method for selectively distributing commercial messages over a communications network. Certain types of messages are tagged and then routed via a network to the appropriate subscriber terminal. The current subject invention differs from the system disclosed in '098 in that the subject invention could be utilized in the process of deciding which customers receive messages, but goes way beyond that minor application.

Related in U.S. Pat. No. 5,696,906 is a telecommunication user account management system and method of use (a traditional "subscriber management system"). A non-dynamic data management scheme is provided for handling analysis and reporting functions for subscriber accounts for cable television services. The analysis and reporting functions include standard procedures such as word processing, editing, emailing, and the like that are pre-selected and not easily extendable to different options later desired by a user.

U.S. Pat. No. 5,765,142 presents a method and apparatus for the development and implementation of an interactive customer service system that is dynamically responsive to change in marketing decisions and environments. The invention is an interfacing system that overlays existing data that allows a customer to make a product or service selection if the customer so desires from the products or services presented as a result of the customer's interaction with the interface. This is an interface tool which includes modules for specifying global parameters relating products or services to be presented to the customer through the interface.

Characterized in U.S. Pat. No. 5,799,286 is an automated activity-based management system to assign indirect costs to items like equipment and facilities usage. Both traditional accounting information and analysis schemes are included in the system. A relational database is created and utilized by the system.

U.S. Pat. No. 5,822,410 presents a churn (deactivation of an active customer account) amelioration system and method of use (i.e., a scoring process). Based on a preexisting set of rules, the system evaluates customers in response to worth and automatically prompts appropriate customers for pre-approved potential offers and actions. Data within the current subject data warehouse, as opposed to the '410 system, could be utilized to determine which customer is to churn, but the subject invention does not actually decide if a customer is about to churn.

A telecommunication user (subscriber) account management system and method of use are described in U.S. Pat. No. 5,884,284. The system creates, maintains, processes, and analyzes data regarding individual users for telecommunication services. Specific, preexisting capabilities are included in the data analysis portion of the invention. The current subject invention contains not only preexisting or "canned" report capabilities, as in '284, but easily modifiable templates and programming that may be manipulated to fit exactly the business.

The foregoing background information and patents reflect the state of the art of which the applicant is aware and is tendered with the view toward discharging applicant's acknowledged duty of candor in disclosing information which may be pertinent in the examination of this application. It is respectfully submitted, however, that this information and patents do not teach or render obvious applicant's claimed invention.

SUMMARY OF THE INVENTION

An object of the present invention is to provide a computer based historical data warehouse system that may be easily manipulated for the extraction and generation of useful information and reports.

Another object of the present invention is to furnish a computer based historical data warehouse system that may be easily manipulated for the extraction and generation of useful information and reports, wherein operational data having no time reference is amended with a time dimension to create subject-oriented data.

A further object of the present invention is to supply a computer based historical data warehouse system that may be easily manipulated for the extraction and generation of useful information and reports, wherein operational data having no time reference is amended with a time dimension to create subject-oriented data in a two-step process having a first data pre-processing step followed by a second data transformation step.

Yet a further object of the present invention is to describe a computer based system for controlling and manipulating information for a goods or services provider with the flexibility of easily adapting (in any compatible computer language) a "reporting" module for the needs of different customers (including, but not limited to telecommunications, utilities, consulting, design, and educational areas) while not necessarily changing an associated "operational" module responsible for revenue production.

Still yet another object of the present invention is to describe a computer operated system and method of use for processing information in which operational data is transformed into a form of dynamic subject-oriented data that may be easily manipulated by a user to extract useful information.

Yet an additional object of the present invention is to disclose a computer based historical data warehouse system that may be easily manipulated for the extraction and generation of useful information and reports, wherein operational data having no time reference is amended with a time dimension to create subject-oriented data in a two-step process that employs re-use of various operational codes over time and having a first data pre-processing step followed by a second data transformation step.

Disclosed is a computer operated historical data warehouse system that is utilized by a provider of goods or services such as a telecommunication related enterprise, a utilities company, and the like. Generally, the subject system comprises a computer facilitated or controlled and implemented data warehouse system that is easily adapted for various report and analysis purposes. Usually, the computer system utilizing the subject historical data warehouse comprises a first data base module (usually running on a first computer or computers) for handling essentially all of the revenue generating activities of the enterprise and a second data base module (usually running on a second computer or computers) for processing essentially all report generating and analyzing activities for the enterprise.

The historical data warehouse subject invention is operational within the paradigm of a computer facilitated environment. Clearly, suitable computer means, programming means, computer languages, platforms, formats, and the like, now known or later developed, are acceptable for running the subject system within the parameters of this disclosure. Those skilled in the relevant art will appreciate that certain existing computers and computer languages are more readily adapted for the subject system than others, however, many differing combinations of supporting hardware and software may run the subject invention and are considered applicable within the realm of this disclosure.

Although the subject invention may be utilized within most general enterprise or business settings, an exemplary usage is in a field that deals with utility providers and telecommunication service providers (the latter supplying cable and cable-related goods and services to viewers). For the telecommunication example, usually, the computer based subject invention, essentially, merges a data warehousing subsystem with a cable information handling subsystem and then segregates certain functionality to create two high level system environments, frequently: 1) an "operational" or "production" module and 2) a "decision support" or "report" module. The "operational" module is responsible for performing the traditional functions of order processing, payment processing, call rating, and the like involved with providing cable services and products. Generally, the basic function of the "operational" module is directed towards revenue generation (order processing) and servicing/provisioning (customer care, with the customer being the end user of the subject system). The "decision support" module contains all the existing reporting functionality combined with a full complement of data warehousing and reporting functions. The capability to generate a few of the reports (transaction reports like print batch summaries and details, statement production, and similar reports) may be, for convenience sake or customer usage, integrated with the "operational" module and not into the "decision support" module. However, these retained reporting capabilities are few in number and do not detract from the basic concept that the vast majority of report functions exist in the "decision support" module. Usually, the two modules are "machine" or computer distinct in that there are two data base servers (one for the "operational" module (e.g.: and ORACLE™ RDBMS (relational database management system)) and a second one for the "decision support" (e.g.: a data warehouse RDBMS such as Decision Server™ from Informix)) and consequently two separate computers are usually preferred. The distinct databases are kept "equal" (but are not identical in content or structure) either real-time or periodically (usually daily or some other selected time interval) via change data capture and database connectivity tools. This, of course, is precisely the main technical reason for creating independent modules: enhanced performance for both systems.

Usually, the subject historical data warehousing system/process/program is utilized to connect the operational and decision support modules and comprises the event or time-driven off-loading of strategic, analytical business information from an operational system to a potentially lower cost server. The off-loaded data is subject oriented and time-variant. Unlike data on the operational system, the subject oriented data covers a much larger time horizon, includes multiple databases that have been cleansed (data defined uniformly), and is optimized for answering complex queries from direct users and applications. Usually, the subject oriented data in the historical data warehouse is utilized for decision support rather than operations. Different types of users can summarize the subject oriented data at various levels to facilitate access.

The subject historical data warehouse provides a means to produce data that can be used to perform in-depth analytical analyses of the utilizing business (usually via ROLAP or Relational On Line Analytical Processing). Analysts can perform complex analyses using comprehensive drilling capabilities to enable drill up, down within, and across the supplied subject oriented data. For example, executives in a business can use graphical drilldown capabilities and retrieve information via point and click technology utilizing graphics and buttons to access desired information via web-based applications. Also, the subject invention provides "knowledge" workers with query capabilities to do ad hoc database navigation, drilling, and point and click reporting. Additionally, casual users can employ the subject invention to retrieve data from the subject warehouse for use in other application such as Microsoft Excel™ or Access™. Further, remote users can use a standard web browser for accessing the data.

Preferably, the subject historical data warehouse does not reside on the operational system, thus system overhead, performance management, and security concerns with the production system are minimal. Since business data is located in a single warehouse, data fragmentation is eliminated and users can issue queries without IT support.

The creation of any "enterprise data warehouse" is a large undertaking for any organization. It involves gathering user requirements, deciphering data to best accommodate the user requirements, defining the system architecture, cleaning the data, and loading it into the data warehouse, defining a mechanism to keep the data current in the data warehouse, defining the mechanisms to get information out of the data warehouse, user education and training and operational education and training. Traditionally, data warehouses are costly and time-consuming custom projects. Approximately, eighty percent of the project time goes to gathering requirements and making the resultant information available (implementation). An accomplished goal for the subject invention was to put the data warehouse in a "box" (readily adaptable format for any existing purposes and any future or not-yet-known purposes) and cut the implementation time. In practice, usually, the longest lead item was user training. The subject historical data warehouse is very flexible to meet a variety of end user requirements and is able to accommodate any end-user tools. It is easy to modify and maintain as the primary users and maintainers of the data warehouse were non-IT personnel.

It should be noted that many companies have traditional data warehouses that can be implemented in a repeatable process including consulting firms and software development firms. They all start with gathering the end user requirements and selecting data to put in the data warehouse. Key to the subject invention is that the subject historical data warehouse does not start with user requirements. It starts with the premise that all data that is "analyzable," either now or later, should go into the data warehouse. All data should be made available to the end user and not just the data that "currently" appears useful. All of the back end work with collecting the data, cleansing the data, and formatting and loading the data is done by the subject invention. Data is loaded into the subject data warehouse everyday (or at any other predetermined time period) with the previous day's data available the next morning for analysis.

More specifically, the subject invention comprises a computer system and a method, embodied in a computer program(s), for generating an historical data warehouse in which operational data is converted in a two-step process into subject-oriented data. After obtaining operational data records from a legacy source system, the two-step process comprises a first pre-processing stage followed by a second transformation stage.

In the first step a pre-processor utilizes the obtained operational data records to generate pre-processed data records. The pre-processing comprises operating on each operational data record in a stepwise manner, adding new data to an immediately prior operated-on record with an entry being recorded only for the record having the last stepwise operation. It must be noted that existing systems add data to the original record which is then recorded and the process repeated for the next bit of data. The subject invention does not record at each data addition. The subject invention's stepwise manner only records the final operated-on data, a much more efficient process than prior techniques.

In the second step pre-processed data records are transformed into related subject-oriented data records. The transforming comprises linking related pre-processed data records together by means of reusable primary keys and dates obtained by trigger or log-scraping within the RDBMS. The pre-processed and transformed data is then stored in the related subject-oriented data records in the historical data warehouse. Usually, the subject system includes standard viewing means such as browsers, spreadsheets, and the like.

Other objects, advantages, and novel features of the present invention will become apparent from the detailed description that follows, when considered in conjunction with the associated drawing.

DESCRIPTION OF THE PREFERRED EMBODIMENT

The subject invention utilizes a change data capture methodology to build an historical data warehouse for various suitable users. The activity based integrated data warehouse (historical data warehouse) processes transaction data into a format that is optimized for analytical and query reports. The constraints on the legacy source system makes the Extract/Transform/Load (ETL) processes different from those commonly used in a data warehouse environment.

For exemplary purposes only, a telecommunication operator will be employed as a typical user of the subject invention and specific references will be directed to the typical operations of such a user. Generally, the subject method/program processes or loads the transactional, legacy, raw, initial, or original operational data into a "dynamic" subject-oriented format that is stored in the historical data warehouse and is accessed by standard means such as web browsers (for example and not by way of limitation: MS-Internet Explorer™ or NetscapeNavigator™), spread-sheet programs (for example and not by way of limitation: MS-Excel™), database programs (for example and not by way of limitation: MS-Access™), and the like.

Figure 1:
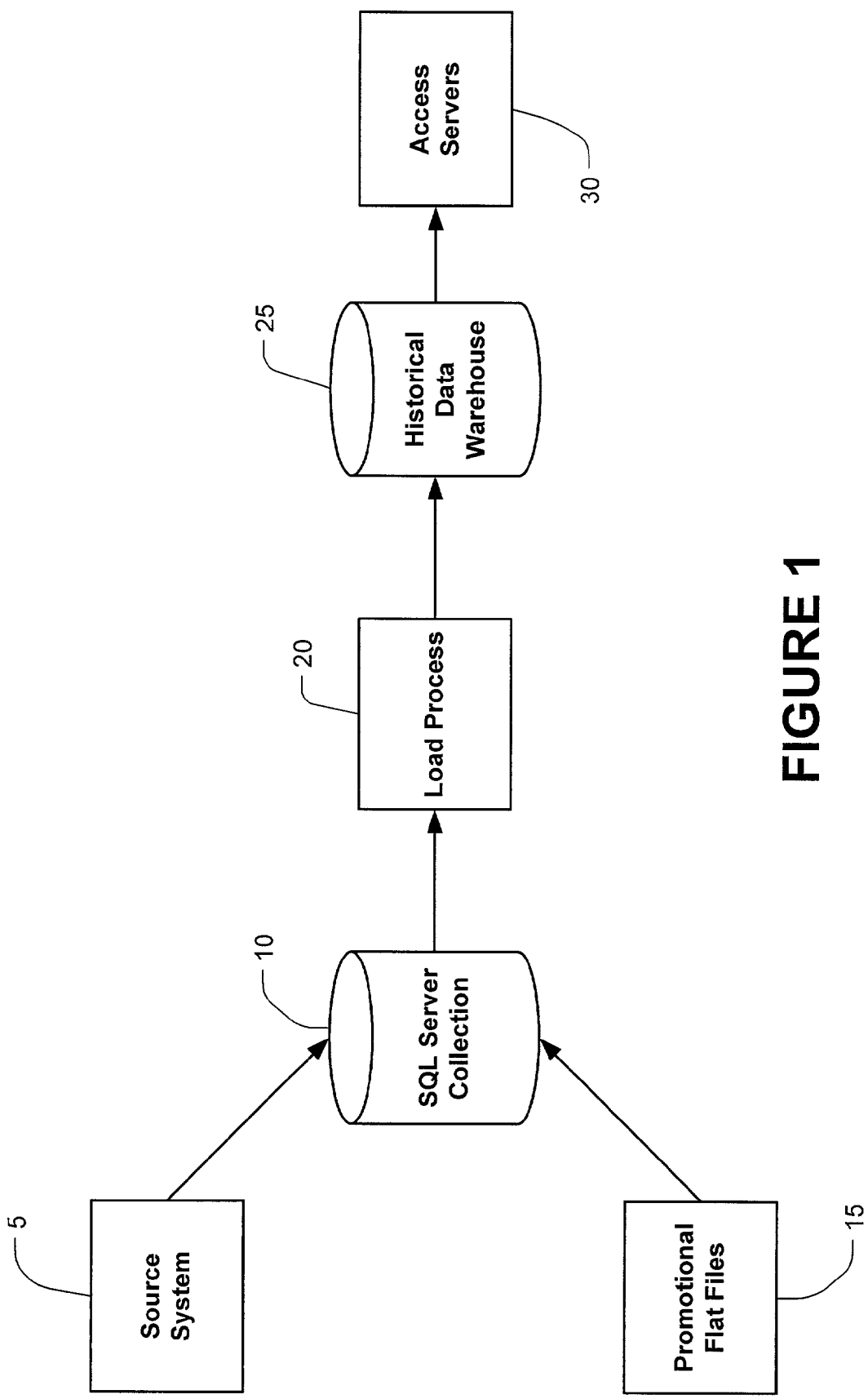
FIG. 1 is a flow/schematic diagram illustrating the subject invention.

Referring now to FIG. 1, as operational transactions are committed to an RDBMS on the legacy (pre-existing) source system(s) 5, the data in the individual transactions (Insert, Update, Delete) are captured and forwarded to the SQL server collector database 10 via triggers or log-scraping. Date/timestamps are derived from the triggers or log-scraping. The source system 5 has a batch process that produces individual promotional records (user defined parameters) into a proprietary formatted flat file 15. These promotional records are decoded into records that can be placed into the SQL server collector database 10. Date/timestamps are derived from the batch date. The load process 20 integrates and processes (a two-step process) the data from the SQL server collector database 10 into the historical data warehouse 25. Report or access servers 30 are attached to the historical data warehouse 25 to get the data out of the warehouse 25 and unto the user's desktop. Preferably, the historical data warehouse 25 includes a standard set of core reports, components, and metadata that are identical for each implementation.

It must be kept in mind that several operational data or system characteristics exist and were taken into account in the subject invention, including:

1. The legacy source system records are not directly date/timestamped. However, a RDBMS associated with the legacy source system may be utilized in obtaining dates.
2. The legacy source system re-uses the primary key on all records and keeps only the current record of all reference tables. The completed records on the source system can be inaccurate for reporting purposes because previous reference table values are not kept. The warehouse data needs to be accurate.
3. The legacy source system has some inefficiency. Instead of doing an Update when a record changes, on some occasions it does a Delete followed by an Insert. On occasion, rather than doing one Update to update all of the fields in the transaction, the source system does several updates and/or combinations of Delete and Insert to change the data. This "noise" should be kept out of the data warehouse, as it will skew reporting (i.e. Delete/Insert or Insert/Delete could be skewed as churn rather than updates or changes).
4. Products/services purchased are subscription based with an indefinite end date. (cable services, high speed data services, telephony services) Orders start the receiving of the products/services and orders stop the receiving of products/services. Products/services are tracked by a customer after they are sold.

Figure 2:
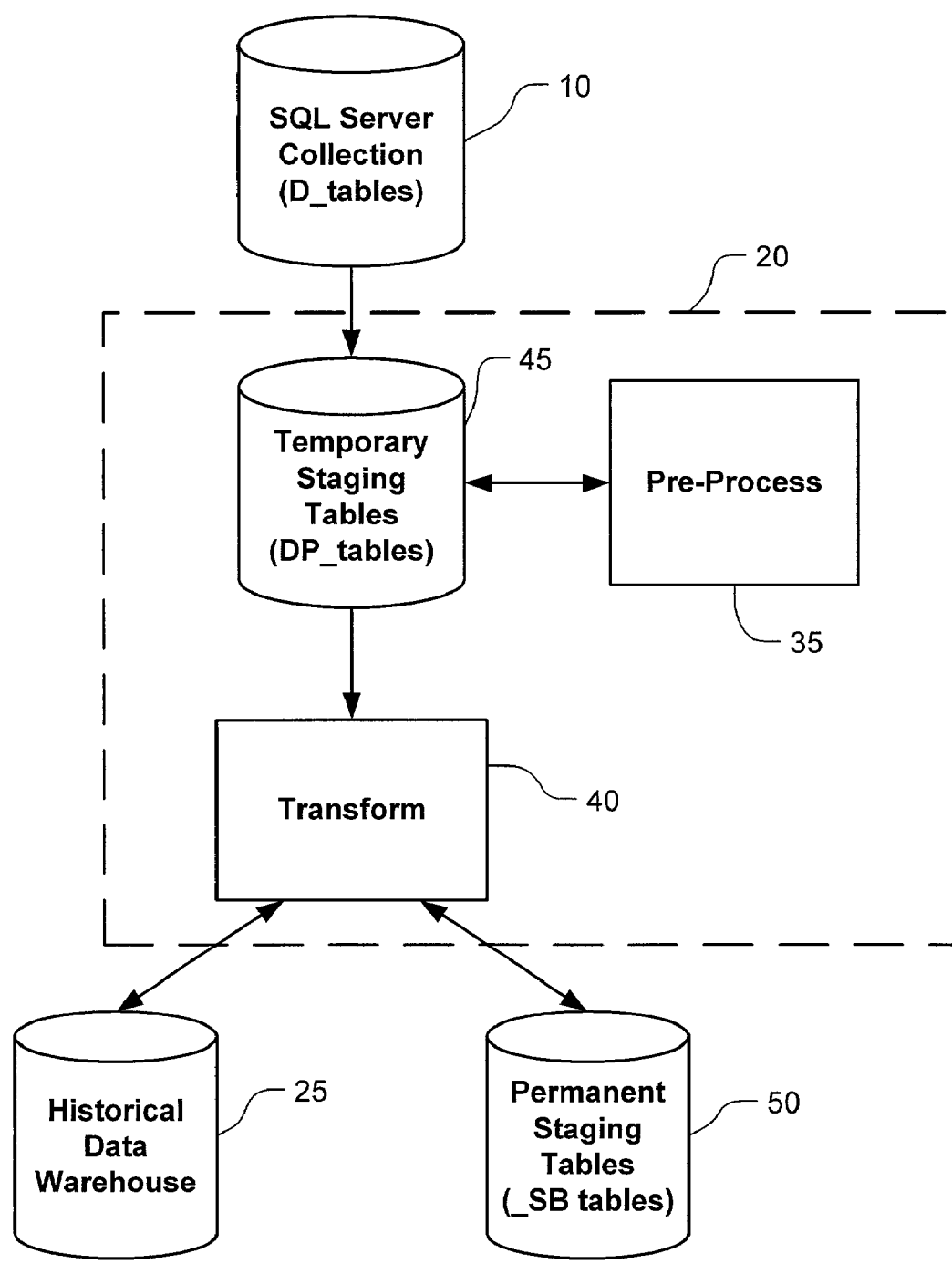
FIG. 2 illustrates that the subject invention load process is broken down into a two-step process: pre-processing and transforming.

FIG. 2 illustrates that the load process 20 is broken down into a two-step process: pre-processing 35 and transforming 40. Also, there are some temporary staging tables 45 (DP_tables) that exist as long as the load is going on and permanent staging tables 50 (_SB tables—the_SB is shorthand for the term "sandbox") that exist all the time (also note that D_tables exist in the SQL server collection 10). These processes are described in more detail below.

Pre-processing Description

Several traditional problems were solved by the subject pre-processing step. Records must be processed in the order in which they occurred on the source system to get accurate history. In order to get fast load speeds in the warehouse, most Extract Transform and Load (ETL) tools use the RDBMS loader. The loader can only look at the record as it exists in the warehouse currently and the record that it needs to modify or insert into the warehouse.

With change data capture methodology, a single record can have a series of transactions against it. An order can be inserted (I). It can be updated (U). It can be deleted (D) and it can be re-inserted (D/I). Other than the first insertion and the last delete, there can be many updates, deletes, and re-inserts during the active life of an order. Depending upon the business rules of the source systems, sometimes each individual change is captured and sometimes the records are rolled up into one record by date.

When loading the data from the SQL server collector tables to the subject warehouse it is done as a batch of "like transactions." This means that the delete, insert, and update processes run independent of each other. As an example, given that the transactions were I/D/I, then if the deletes ran first then an error will occur because the record has not been inserted. When the second insert occurs it will cap off the first with its TRANS_TIME value instead of the TRANS_TIME value of the D record.

The following example clearly shows the problem (see Table 1). In the warehouse there are two updateable columns with the values of C and Q (starting warehouse values). Three update transactions come in with each transaction only updating one of the columns. The problem is that only the last transaction will be recorded into the warehouse because the records are not committed until the end.

TABLE 1

| Starting Warehouse Values of C and Q | | | |
|---|---|---|---|
| Input Records Trans Type | Input Records Data Values | Warehouse Without Pre-processing | Warehouse With Pre-processing |
| | | C Q (recorded) | C Q (recorded) |
| U | B - | B Q (recorded) | - - (B Q not recorded) |
| U | - C | C C (recorded) | - - (B C not recorded) |
| U | B - | B Q (recorded) | B C (recorded) |

Notice that in the non-pre-processed situation each intermediate value (BQ and CC) is recorded and each one denotes a change that starts with the original value (CQ) (every record goes back to the original record), while in the subject pre-processed case the dashes indicate that the intermediate changed values (BQ and BC) are not recorded and that each value results from a serial or stepwise operation on the immediately previous value, not always on the original value, as happens with the non-pre-process situation.

Plainly, processing the records into the warehouse in transaction order will take far too long. The subject pre-processor adds data to records that came from other records in the job stream. This allows the records to be processed individually. The pre-processor will run after all the jobs that take the data from SQL server D_tables to DP_tables has been run. After the pre-processor is run, the jobs that take the data from the DP_tables to the warehouse will be run. The pre-processor operates on all records that have a "P" in the C_PROCESS_CODE. When it is done with the record, it will change to a "N" or "Y". By way of example, see Table 2.

TABLE 2

| Data Fields That May Be Used and/or Filled In By Pre-processor | | | | | |
|---|---|---|---|---|---|
| Trans_ Type | Prev_Flag | Cur_Flag | Prev_End_ Date | Cur_End_ Date | Process_ Code |

Wherein for:
Trans_Type
I=Insert, U=Update, D=Delete
Prev_Flag
Default=N
Y=Delete the record from the permanent staging table and process this record instead (D/I).

Cur_Flag
Default=N
Y=Process this record into the warehouse and delete it from the permanent staging table (I/D).
Prev_End_Date
Date/time of a previous or current record that is used to cap off a previous record.
Cur_End_Date
Date/time of a previous or current record that is used to cap off this record.
Process_Code
Y=Pre-processed, do not process again or further
N=Pre-processed, ready for transformation
P=Ready for pre-processor
There are 4 types of pre-processing depending upon how the source system behaves.

Type 1—Ignore

No preprocessing is needed because:
1—D records are ignored (process code change to Y)
2—U and I records will update the record if it exist and insert it if it does not.
3—Transformation process will handle simple U and I records in the same input stream. The logic is:
If record is already in the warehouse then update it.
If not then insert the record
For U records not in the warehouse check to see if an I record is in the input stream. If so then update the I record with the U record data.
The following exemplary tables use Ignore logic:
DP_CNTROLPARAMS
DP_EVTTITLE
DP_RATERPTCTRS
DP_ZIPMASTER Type 2—Insert Table 3 illustrates Insert logic.

TABLE 3

Insert Logic

| TRANS TYPE | ACTION |
|---|---|
| D | Take no action, process as Delete |
| I | Take no action, process as Insert |
| U | Change the U to an I |
| D/I | Where D process code = N |
| | Put the D trans time in column 'prev end date' of I |
| | Change D process code to Y |
| D/U | Illogical combination |
| | Where D process code = N |
| | Put the D trans time in the 'prev end date' column of U |
| | Change the D process code to Y |
| | Change the U to an I |
| D/D | Illogical combination |
| | Change the second D process code to Y |
| I/U | Apply U record trans time to the I record 'curr end date' |
| | Apply the I trans time to the its 'prev end date' |
| | Change the U to an I |
| I/I | Illogical combination |
| | Apply the 1st I trans time to the its 'prev end date' |
| | Apply the 2nd I trans time to the 1st 'curr end date' |
| | Apply the 2nd I trans time to the its 'prev end date' |
| I/D | Where D process code = N |
| | Apply the I trans time to the its 'prev end date' |
| | Put the D trans time in column 'curr end date' of I |
| | Change D process code to Y |

TABLE 3-continued

Insert Logic

| TRANS TYPE | ACTION |
|---|---|
| U/I | Illogical combination |
| | Apply I record trans time to the U record 'curr end date' |
| | Apply the U trans time to the its 'prev end date' |
| | Change the U to an I |
| U/D | Where D process code = N |
| | Apply D record trans time to the U record 'curr end date' |
| | Apply the U trans time to the its 'prev end date' |
| | Change the U to an I |
| | Change the D process code to Y |
| U/U | Apply the 1st U trans time to the its 'prev end date' |
| | Apply the 2nd U trans time to the 1st 'curr end date' |
| | Change both U to I |

NOTES:
The D records in these tables mean cap off the existing record. U and I records are processed the same into the warehouse by capping off the existing record and adding another one. Updates are treated the same as inserts.

The following tables use Insert logic:
DP_CODE36
DP_CODE95
DP_CODE999
DP_OPRIDS
DP_PROBLEMCODE
DP_SLSMN
DP_STUDIOTABLE
DP_TECHS Type 3—Update Table 4 illustrates Update logic.

TABLE 4

Update Logic

| TRANS TYPE | ACTION |
|---|---|
| D | Take no action, process as delete |
| I | Take no action, process as insert |
| U | Take no action, process as update |
| D/I | Where D process code = N |
| | Put the D trans time in column 'prev end date' of I |
| | Change D process code to Y |
| D/U | Illogical combination |
| | Where D process code = N |
| | Put the D trans time in the 'prev end date' of U |
| | Change the D process code to Y |
| D/D | Illogical combination |
| | Change the second D process code to Y |
| I/U | Apply the U data to the I record |
| | Change the U process code to Y |
| I/D | Where D process code = N |
| | Put the D trans time in column 'curr end date' of I |
| | Change D process code to Y |
| I/I | Illogical combination |
| | Apply the 2nd I trans time to the 1st 'curr end date' |
| U/I | Illogical combination |
| | No action to take because both U and I will update if in warehouse and insert if not |
| U/D | Where D process code = N |
| | Put the D trans time in column 'curr end date' of U |
| | Change D process code to Y |

TABLE 4-continued

Update Logic

| TRANS TYPE | ACTION |
|---|---|
| U/U | Where U process code = N<br>Apply the data of the 2$^{nd}$ U to the 1$^{st}$<br>Change the process code of the 2$^{nd}$ U to Y |

NOTES:
The D records in these tables mean cap off the existing record. U and I records are processed the same into the warehouse. If they already exist in the warehouse, they are updated. If they do not exist in the warehouse, they are inserted. Updates are treated as updates.

The following tables use Update logic:
DP_ALTSERVICEADDRS
DP_AUXCUST
DP_AUXHOUSE
DP_COMPLEXMASTER
DP_CUSTBILLADDR
DP_CUSTMASTER
DP_EVTCHARGES
DP_EVTCHRGLVLS
DP_EVTORDERS
DP_EVTSHOWING
DP_HOUSEMASTER
DP_PPVDISTR
DP_RATECODE
DP_RPTCTRS Type 4—Replicate Table 5 illustrates Replicate logic.

TABLE 5 replicate Logic

| TRANS TYPE | ACTION |
|---|---|
| D | Take no action, process as delete |
| I | Take no action, process as insert |
| U | Take no action, process as update |
| D/I | Process as individual transactions |
| D/U | Illogical combination<br>Process as individual transactions,<br>Error handling will handle |
| D/D | Illogical combination<br>Process as individual transactions<br>Error handling will handle |
| I/U | Apply the U data to the I record<br>Change the U process code to Y |
| I/D | Where D process code = N<br>Set the CURR_FLAG to Y for the I<br>Set the process code to Y for the D<br>After I is processed through, a script will run that<br>will set process code to Y where CURR_FLAG = Y |
| I/I | Illogical combination<br>Process as individual transactions<br>Error handling will handle |
| U/I | Illogical combination<br>Process as individual transactions<br>Error handling will handle |
| U/D | Where D process code = N<br>Set the CURR_FLAG to Y for the U<br>Set the process code to Y for the D<br>After U is processed through, a script will run that<br>will set process code to Y where CURR_FLAG = Y |

TABLE 5-continued replicate Logic

| TRANS TYPE | ACTION |
|---|---|
| U/U | Where U process code = N<br>Apply the data of the 2$^{nd}$ U to the 1$^{st}$<br>Change the process code of the 2$^{nd}$ U to Y |

NOTES:
The D records in these tables mean delete the record. U records that do not exist in the warehouse will get ERROR (partial). I records that already exist in the warehouse will get a warning.

The following tables use Update logic
DP_WIPMASTER
DP_WIPOUTLET
DP_WIPCUSTRATES

Transforming Description

The subject transforming process is illustrated by using as an example: Reference Table EFF_DATE and END_DATE. The legacy source system re-uses the primary keys on all records. For example Code B can have different descriptions over time (see Table 6).

TABLE 6

Re-use of Primary Keys

| | CODE | DESCRIPTION | EFF_DATE | END_DATE (timestamp) |
|---|---|---|---|---|
| 1 | B | TOO EXPENSIVE | Dec. 12, 1997 | Dec. 12, 1997 |
| 2 | B | POOR SERVICE | Dec. 12, 1997 | Dec. 15, 1997 |
| 3 | B | LOST JOB | Dec. 15, 1997 | Dec. 16, 1997 |
| 4 | B | SATELITE | Dec. 16, 1997 | Dec. 31, 9999 |

A critical consideration for the subject invention is that the legacy source system does not date/timestamp the records (no dates directly associated with the records) such that the date/timestamp is available as data inside the legacy source system relational data base. Date/timestamps are needed in order to keep records with identical primary keys in order (the reference primary keys are reused over time). When the records are extracted out of the legacy source system, they must be extracted from the RDBMS logs or the RDBMS trigger processing so the date of the Insert, Update and Delete is captured. This allows the subject invention to affix date/timestamps to records where there are none in the legacy source system. Again, date/timestamps are needed because of the re-use of the primary keys on the legacy source systems. The date/timestamp of the record allows the selection of the correct record when joining two tables on primary keys where there are duplicate primary keys in the tables.

When creating order records in the warehouse with code B (an exemplary primary key), the system must make sure it gets the correct description for B. The reference warehouse tables have an EFF_DATE and END_DATE column: the EFF_DATE=C_TRANS_TIME is the system date/timestamp of when the record was "created" and the END_DATE=C_TRANS_TIME is the date/timestamp of when the records was "deleted." If a record was "created" and "deleted" on the same day, the EFF_DATE and END_DATE will be equal. These dates come from a transaction log and are not a part of the legacy source system. These dates are important because fact records with an EFF_DATE will look for the first DW_ids from these LU_tables with fact EFF_DATE equal or greater than the LU_table's EFF_DATE and less than the LU_table's END_DATE (see Table 6 above).

If a fact record has an EFF_DATE=12/14/97, description=POOR SERVICE (12/14/97, GE (greater than or equal) 12/12/97, AND 12/14/97 LT (less than) 12/15/97).

If a fact record has an EFF_DATE=12/12/97, description=POOR SERVICE (12/12/97 GE 12/12/97 AND 12/12/97 LT 12/15/97).

re-use of the primary key, it may be difficult to determine to which table the record should belong. This table holds an entry for all 'current' order records that are in the legacy source system. When a deleted record comes in, the record is deleted from the DP_WIPMASTER_SB. This usually indicates that the key will be re-used shortly. Prev_Flag and Cur_Flag, previously described, help manage this table.

An example of typical entries in DP_WIPMASTER_SB follows (see Table 7). All of the data comes from the DP_WIPMASTER record except C_PROCESS_CODE and ORDER_DW_ID.

TABLE 7

Generalized Possible DP_WIPMASTER_SB Entries

| C_TRANS_TYPE | C_TRANS_TIME | PREV_END_FLAG | CURR_END_FLAG | C_PROCESS_CODE | ORDER_DW_ID | Record Data |
| --- | --- | --- | --- | --- | --- | --- |

If a fact record has an EFF_DATE=12/15/97, description=LOST JOB (12/15/97 GE 12/15/97 AND 12/15/97 LT 12/16/97).

If a fact record has an EFF_DATE=10/15/98, description=SATELITE (10/15/98 GE 12/16/97 AND 10/15/98 LT 12/31/9999).

Figure 3:
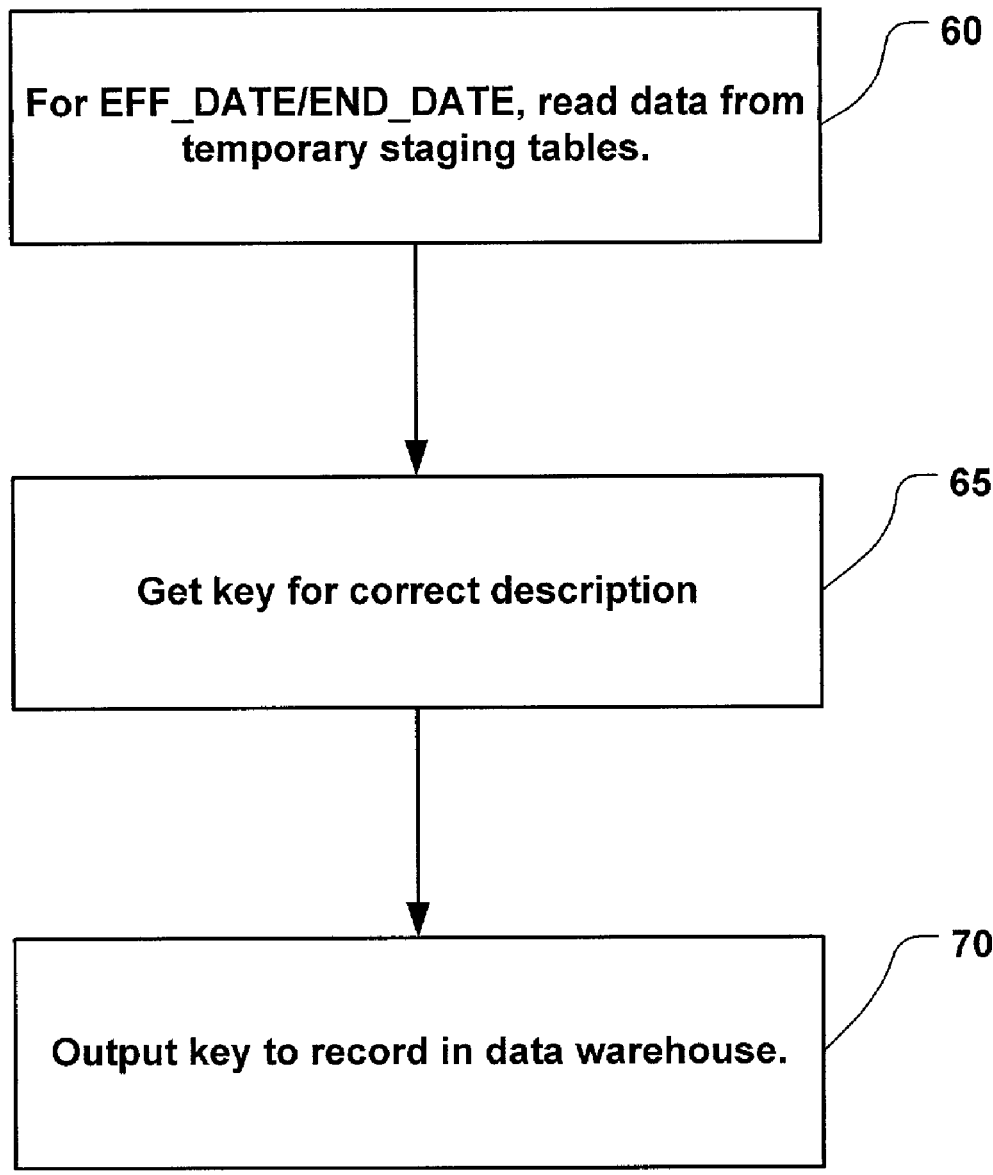
FIG. 3 shows Eff_Date and End_Date processing by the subject invention.

As seen in FIG. 3, the data is read from the appropriate temporary staging tables 60 and a key for the correct description is obtained 65. The key is then output to the record in the data warehouse 70. When joining an input table on a warehouse table that has an EFF_DATE and END_DATE, the transformation must be joining with the appropriate record. For example, in LU_CUSTOMER, the input is joined with LU_CUSTOMER on SS_HOUSE and SS_CUST. In the warehouse over time, there will be more than one record in LU_CUSTOMER with the same SS_HOUSE and SS_CUST. The C_TRANS_TIME of the input record must be greater than or equal (GE) than the CUST_EFF_DATE and less than (LT) the CUST_END_DATE.

Transformation Example:

For clarity, an example of a subject transformation that handles the problems presented by a legacy source system is now provided.

Figure 4:
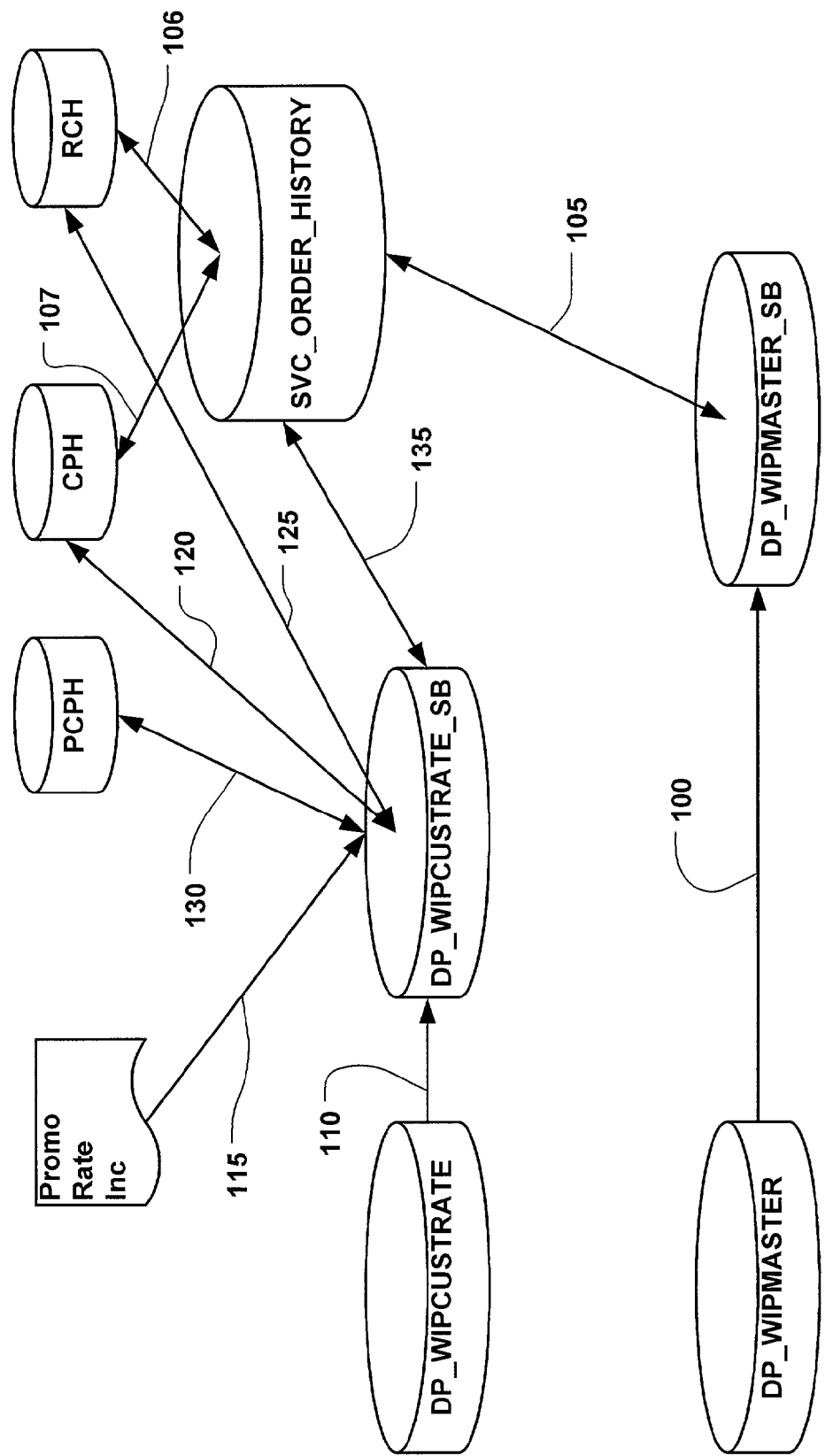
FIG. 4 exemplifies the transform process of the subject invention using two typical tables from the legacy source system.

Records have already been pre-processed and are in DP_WIPMASTER. (See FIG. 4).

1. Process records from DP_WIPMASTER to DP_WIPMASTER_SB (see FIGS. 4 and 5, elements 100, 101, 102, and 103).

DP_WIPMASTER_SB (_SB is the shorthand abbreviation for "sandbox") is a permanent staging table and holds a record for each current order on the source system. DP_WIPMASTER_SB holds 3 types of records: service orders; trouble call orders; and SRO orders. These are differentiated by status. Update transactions only contain the fields that changed. If the field did not change, it will come in as null. This table serves to help identify Update transactions as far as to what is the status and ORDER_DW_ID, thus, the invention can tell which table (SVC_ORDER_HISTORY (SOH), TC_ORDER_HISTORY, or SRO_ORDER_HISTORY) and which record in the table to update. With the Wherein for:
C_PROCESS_CODE
N=Not processed
Y=Processed, do nothing further
S=Processed into SVC_ORDER_HISTORY
F=Processed into SVC_ORDER_HISTORY and its WIPCUSTRATE records have been processed also.
and
ORDER_DW_ID
The primary key of the SVC_ORDER_HISTORY record for this entry will be used to process any updates and used as references to other tables.

Figure 5:
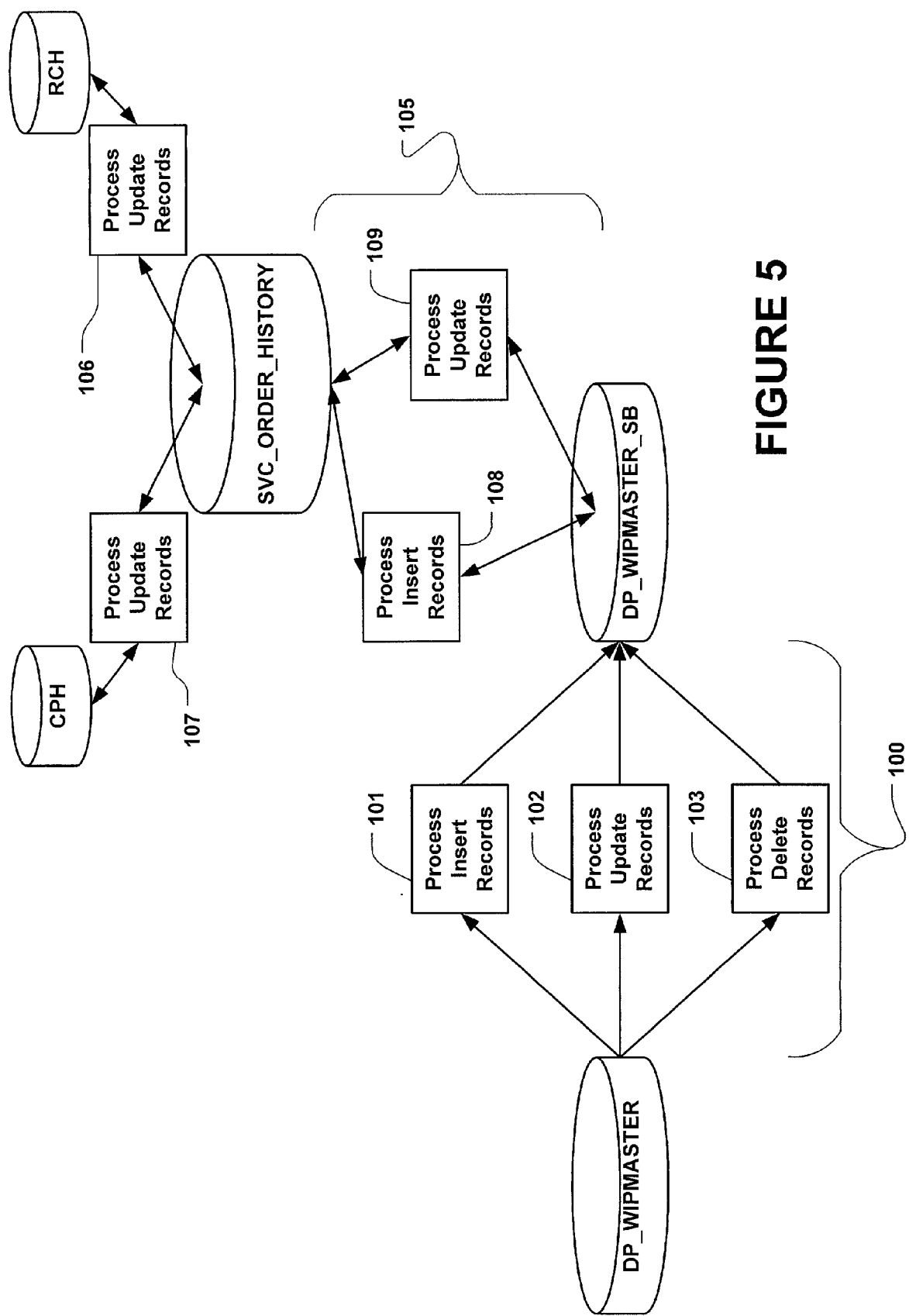
FIG. 5 shows an example of the subject invention processing records into an SVC order history (an historical warehouse table) and is seen, in a general form, within FIG. 4.

FIG. 5 shows the details (generally seen in FIG. 4, 100) of the DP_WIPMASTER records being processed into DP_WIPMASTER_SB.

Insert 'I' records 101:
If the record does NOT exist in DP_WIPMASTER_SB then:
Insert into DP_WIPMASTER_SB with a C_PROCESS_CODE of 'N'
If the record does exist and Prev_Flag=Y, delete the record and insert this record.
If the record does exist and Prev_Flag=N, then set the DP_WIPMASTER record as an 'E' error else set DP_WIPMASTER record as 'Y' (processed).

Update 'U' records 102:
If the record does exist in DP_WIPMASTER_SB then:
Update DP_WIPMASTER_SB and set the C_PROCESS_CODE to 'N'
If it does NOT exist then mark the DP_WIPMASTER record as an 'E' error else set DP_WIPMASTER to 'Y'

Delete 'D' records 103:
If the record does exist in DP_WIPMASTER_SB then:
Set the C_PROCESS_CODE to 'Y' in DP_WIPMASTER_SB (Will be deleted)
If the DP_WIPMASTER_SB record (parent) is deleted, the DP_WIPCUSTRATES_SB and DP_WIPOUTLET_SB (Children) associated with the DP_WIPMASTER_SB must be deleted
A script to join DP_WIPMASTER_SB with C_PROCESS_CODE='Y' to DP_WIPOUTLET/WIPCUS- TRATE_SB with C_PROCESS_CODE of 'F' (records have been processed on a previous run) and set the C_PROCESS_CODE to 'Y'

If the children's C_PROCESS_CODE is not set to 'F' then set the C_PROCESS_CODE to 'E' error for DP_WIPMASTER_SB and DP_WIPOUTLET/WIPCUSTRATE_SB If the record does NOT exist in DP_WIPMASTER than mark the record as a 'W'.

2. Process records from DP_WIPMASTER_SB to SVC_ORDER_HISTORY (see FIGS. 4 and 5, elements 105, 108, and 109).

DP_WIPMASTER_SB loads SVC_ORDER_HISTORY with DP_WIPMASTER_SB statuses of 1, 2, 3, 4, 5, 6, 7, 8, a, b, c, and d with DP_WIPMASTER_SB PROCESS_CODE='N'.

Insert 'I' records 108:

The record is located in SVC_ORDER_HISTORY using primary keys status and ORDER_ENTRY_DATE in DP_WIPMASTER_SB. If the record is found, it is an error and if the record is not found, insert the record into SVC_ORDER_HISTORY.

When inserting (and updating) a record, there are many 'codes' in the input record where a table look-up takes place in order to get the data warehouse key to place into the fact record. The EFF/END date process is used to locate the particular code in the look-up table as that is what was on the legacy system when the order was created. Since the date from the log or triggers is used, the subject invention is sure that this was the code assigned by the legacy source system.

For ALL fields that were "preprocessed" into one record, the C_TRANS_TIME (date/timestamp) comes from the first transaction in the job stream. The preprocessor does this in the subject invention.

Once a record is processed (inserted) into SVC_ORDER_HISTORY, the DP_WIPMASTER_SB process code is set to "S." Update ORDER_DW_ID in DP_WIPMASTER_SB with the primary key of the new record is inserted into SVC_ORDER_HISTORY.

A script runs after the processing is complete that sets all C_PROCESS_CODE to Y if its CURR_END_FLAG=Y (I/D, U/D, I/U/D) and sets all PREV_END_FLAG to N if they equal Y after processing. (D/I).

Update 'U' records 109:

The record is located in SVC_ORDER_HISTORY using status and ORDER_DW_ID in DP_WIPMASTER_SB. If the record is found, update it and if the record is not found, it is an error.

If a record is updated into SVC_ORDER_HISTORY, the system must update the appropriate records in CUST_PRODUCT_HISTORY (CPH) 107 and CUST_RPT_CTR_HISTORY (RCH) 106.

When an update is made to CPH/RCH, the system determines if the CPH/RCH is from an activation of a code of a deactivation of a code. A service order can have both, since an order can have both + codes and − codes.

In CPH/RCH the following SVC_ORDER_HISTORY fields belong to the activation (+ratecode):
SVC_ORDER_DW_ID
CORP_ACTIV_RSN In CPH/RCH the following SVC_ORDER_HISTORY fields belong to the deactivation (−ratecode):
SVC_ORDER_DW_ID
CORP_DEACTIV_RSN In CPH/RCH the following SVC_ORDER_HISTORY fields are common and regardless of activation or deactivation:
CORP_CAMPAIGN
CORP_SALES_METHOD
SALES_REP_DW_ID
OPERATOR_DW_ID
TECH_DW_ID
CORP_CANCEL_RSN_DW_ID
ORDER_ENTRY_DATE
ORDER_DONE_DATE
ORDER_FINALIZE_DATE
ORDER_SCHEDULE_DATE
ORDER_COMPLETE_DATE
ORDER_BILL_DATE
SVC_CYCLE_DATE (CPH ONLY)
WIP_PERIOD Exemplary Update for
CUST_PRODUCT_HISTORY Locate record(s) in CUST_PRODUCT_HISTORY using SVC_ORDER_DW_ID in DP_WIPMASTER_SB:
If record is not found, do nothing.
If record is found, update the appropriate fields. There are multiple records to update.

Exemplary Update for
CUST_RPT_CTR_HISTORY

Locate record(s) in CUST_RPT_CTR_HISTORY using SVC_ORDER_DW_ID in DP_WIPMASTER_SB.
If record is not found, do nothing.
If record is found, update the appropriate fields. There are multiple records to update.
Once a record has been processed (updated) into
SVC_ORDER_HISTORY, the C_PROCESS_CODE for
DP_WIPMASTER_SB is set to "S."
A script runs after the processing is complete that sets all C_PROCESS_CODE to Y if its CURR_END_FLAG=Y (I/D, U/D, I/U/D).
The system sets all PREV_END_FLAG to N if they equal Y after processing. (D/I).

Delete 'D' records:
Records are never deleted out of SVC_ORDER_HISTORY. Delete records are not processed.

Recap of Different Scenarios

CASE 1: A single DP_WIPMASTER record with C_TRANS_TYPE of I:
The entire record will be inserted in to the DP_WIPMASTER-SB.
If the record is already there then it will update the existing record and write a warning.
The ORDER_DW_ID will equal zero in DP_WIPMASTER_SB.
Insert the record into SVC_ORDER_HISTORY.
If the record already exists then mark it (DP_WIPMASTER_SB) as an error else insert it.
Set the C_PROCESS_CODE to S in DP_WIPMASTER_SB.
Update ORDER_DW_ID with the primary key of the new record in DP_WIPMASTER_SB.

TABLE 8

DP_WIPMASTER after preprocessing.

| ID | PREV_FLAG | CURR_FLAG | TRANS_TYPE | PROCESS_CODE |
|----|-----------|-----------|------------|--------------|
| 1  | N         | N         | I          | N            |

TABLE 9

DP_WIPMASTER TO DP_WIPMASTER_SB.

| ID | PREV_FLAG | CURR_FLAG | TRANS_TYPE | PROCESS_CODE |
|----|-----------|-----------|------------|--------------|
| 1  | N         | N         | I          | N            |

TABLE 10

DP_WIPMASTER after moving to sandbox.

| ID | PREV_FLAG | CURR_FLAG | TRANS_TYPE | PROCESS_CODE |
|----|-----------|-----------|------------|--------------|
| 1  | N         | N         | I          | Y            |

TABLE 11

DP_WIPMASTER_SB after processing SVC_ORDER_HISTORY.

| ID | PREV_FLAG | CURR_FLAG | TRANS_TYPE | PROCESS_CODE |
|----|-----------|-----------|------------|--------------|
| 1  | N         | N         | I          | S            |

CASE 2: A single DP_WIPMASTER record with C_TRANS_TYPE of U.
  Find and update the DP_WIPMASTER_SB record.
  Update the record if it exists else mark it (DP_WIPMASTER) as an error.
  Set the C_TRANS_TYPE to U in DP_WIPMASTER_SB.
  Update the SOH (service order history) record if it exists else mark it (DB_WIPMASTER_SB) as an error.
  Update the values in CPH/RCH.
  Set the C_PROCESS_CODE to S in DP_WIPMASTER_SB.

TABLE 12

DP_WIPMASTER updated values.

| ID | PREV_FLAG | CURR_FLAG | TRANS_TYPE | PROCESS_CODE |
|----|-----------|-----------|------------|--------------|
| 1  | N         | N         | U          | N            |

TABLE 13

DP_WIPMASTER TO DP_WIPMASTER_SB values.

| ID | PREV_FLAG | CURR_FLAG | TRANS_TYPE | PROCESS_CODE |
|----|-----------|-----------|------------|--------------|
| 1  | N         | N         | U          | N            |

TABLE 14

DP_WIPMASTER_SB after processing SVC_ORDER_HISTORY

| ID | PREV_FLAG | CURR_FLAG | TRANS_TYPE | PROCESS_CODE |
|----|-----------|-----------|------------|--------------|
| 1  | N         | N         | U          | S            |

CASE 3: A single DP_WIPMASTER record with C_TRANS_TYPE of D.
  Find the DP_WIPMASTER_SB record.
    Set the C_PROCESS_CODE to Y in DP_WIPMASTER else mark it as an error.
    Change the C_TRANS_TYPE to D in DP_WIPMASTER_SB.
    Do not update C_TRANS_TIME.

TABLE 15

DP_WIPMASTER

| ID | PREV_FLAG | CURR_FLAG | TRANS_TYPE | PROCESS_CODE |
|----|-----------|-----------|------------|--------------|
| 1  | N         | N         | D          | N            |

TABLE 16

DP_WIPMASTER to DP_WIPMASTER_SB

| ID | PREV_FLAG | CURR_FLAG | TRANS_TYPE | PROCESS_CODE |
|----|-----------|-----------|------------|--------------|
| 1  | N         | N         | D          | Y            |

CASE 4: DP_WIPMASTER records with C_TRANS_TYPE of I/U.
  Data from the U record is applied to the 'I' record and the C_PROCESS_CODE for the U record is set to Y in DP_WIPMASTER.
  Follow case one.

TABLE 17

DP_WIPMASTER after preprocessing.

| ID | PREV_FLAG | CURR_FLAG | TRANS_TYPE | PROCESS_CODE |
|----|-----------|-----------|------------|--------------|
| 1  | N         | N         | I          | N            |
| 1  | N         | N         | U          | Y            |

TABLE 18

DP_WIPMASTER TO DP_WIPMASTER_SB.

| ID | PREV_FLAG | CURR_FLAG | TRANS_TYPE | PROCESS_CODE |
|----|-----------|-----------|------------|--------------|
| 1  | N         | N         | I          | N            |

TABLE 19

DP_WIPMASTER after moving to sandbox.

| ID | PREV_FLAG | CURR_FLAG | TRANS_TYPE | PROCESS_CODE |
|---|---|---|---|---|
| 1 | N | N | I | Y |
| 1 | N | N | U | Y |

TABLE 20

DP_WIPMASTER_SB after processing SVC_ORDER_HISTORY.

| ID | PREV_FLAG | CURR_FLAG | TRANS_TYPE | PROCESS_CODE |
|---|---|---|---|---|
| 1 | N | N | I | S |

CASE 5:. DP_WIPMASTER records with C_TRANS_TYPE of U/U.

Data from the second U record is applied to the first U record and the C_PROCESS_CODE for the second U record is set to Y in DP_WIPMASTER.

Follow case two.

TABLE 21

DP_WIPMASTER after preprocessing.

| ID | PREV_FLAG | CURR_FLAG | TRANS_TYPE | PROCESS_CODE |
|---|---|---|---|---|
| 1 | N | N | U | N |
| 1 | N | N | U | Y |

TABLE 22

DP_WIPMASTER TO DP_WIPMASTER_SB.

| ID | PREV_FLAG | CURR_FLAG | TRANS_TYPE | PROCESS_CODE |
|---|---|---|---|---|
| 1 | N | N | U | N |

TABLE 23

DP_WIPMASTER after moving to sandbox.

| ID | PREV_FLAG | CURR_FLAG | TRANS_TYPE | PROCESS_CODE |
|---|---|---|---|---|
| 1 | N | N | U | Y |
| 1 | N | N | U | Y |

TABLE 24

DP_WIPMASTER_SB after processing SVC_ORDER_HISTORY.

| ID | PREV_FLAG | CURR_FLAG | TRANS_TYPE | PROCESS_CODE |
|---|---|---|---|---|
| 1 | N | N | U | S |

CASE 6: DP_WIPMASTER records with C_TRANS_TYPE of I/D.

Set CURR_FLAG to Y for the 'I' record.

Set the C_PROCESS_CODE to Y for the 'D' record in DP_WIPMASTER.

Follow case one.

TABLE 25

DP_WIPMASTER after preprocessing.

| ID | PREV_FLAG | CURR_FLAG | TRANS_TYPE | PROCESS_CODE |
|---|---|---|---|---|
| 1 | N | Y | I | N |
| 1 | N | N | D | Y |

TABLE 26

DP_WIPMASTER TO DP_WIPMASTER_SB.

| ID | PREV_FLAG | CURR_FLAG | TRANS_TYPE | PROCESS_CODE |
|---|---|---|---|---|
| 1 | N | Y | I | N |

TABLE 27

DP_WIPMASTER after moving to sandbox.

| ID | PREV_FLAG | CURR_FLAG | TRANS_TYPE | PROCESS_CODE |
|---|---|---|---|---|
| 1 | N | Y | I | Y |
| 1 | N | N | D | Y |

TABLE 28

DP_WIPMASTER_SB after processing SVC_ORDER_HISTORY.

| ID | PREV_FLAG | CURR_FLAG | TRANS_TYPE | PROCESS_CODE |
|---|---|---|---|---|
| 1 | N | Y | I | S |

A script runs that sets C_PROCESS_CODE to Y for all DP_WIPMASTER_SB entries that have its CURR_FLAG set to Y.

CASE 7: DP_WIPMASTER records with C_TRANS_TYPE of U/D.

Set CURR_FLAG to Y on the U record.

Set the C_PROCESS_CODE to Y for the D record in DP_WIPMASTER.

Follow case two.

TABLE 29

DP_WIPMASTER after preprocessing.

| ID | PREV_FLAG | CURR_FLAG | TRANS_TYPE | PROCESS_CODE |
|----|-----------|-----------|------------|--------------|
| 1  | N         | Y         | U          | N            |
| 1  | N         | N         | D          | Y            |

TABLE 30

DP_WIPMASTER TO DP_WIPMASTER_SB.

| ID | PREV_FLAG | CURR_FLAG | TRANS_TYPE | PROCESS_CODE |
|----|-----------|-----------|------------|--------------|
| 1  | N         | Y         | U          | N            |

TABLE 31

DP_WIPMASTER after moving to sandbox.

| ID | PREV_FLAG | CURR_FLAG | TRANS_TYPE | PROCESS_CODE |
|----|-----------|-----------|------------|--------------|
| 1  | N         | Y         | U          | Y            |
| 1  | N         | N         | D          | Y            |

TABLE 32

DP_WIPMASTER_SB after processing SVC_ORDER_HISTORY.

| ID | PREV_FLAG | CURR_FLAG | TRANS_TYPE | PROCESS_CODE |
|----|-----------|-----------|------------|--------------|
| 1  | N         | Y         | U          | S            |

A script runs that sets C_PROCESS_CODE to Y for all DP_WIPMASTER_SB entries that have its CURR_FLAG set to Y.

CASE 8: DP_WIPMASTER records with C_TRANS_TYPE of I/U/D.
Apply the U record data to the I record.
Set CURR_FLAG to Y on the I record.
Set the C_PROCESS_CODE to Y for the U and D records in DP_WIPMASTER.
Follow case one.

TABLE 33

DP_WIPMASTER after preprocessing.

| ID | PREV_FLAG | CURR_FLAG | TRANS_TYPE | PROCESS_CODE |
|----|-----------|-----------|------------|--------------|
| 1  | N         | Y         | I          | N            |
| 1  | N         | N         | U          | Y            |
| 1  | N         | N         | D          | Y            |

TABLE 34

DP_WIPMASTER TO DP_WIPMASTER_SB.

| ID | PREV_FLAG | CURR_FLAG | TRANS_TYPE | PROCESS_CODE |
|----|-----------|-----------|------------|--------------|
| 1  | N         | Y         | I          | N            |

TABLE 35

DP_WIPMASTER after moving to sandbox.

| ID | PREV_FLAG | CURR_FLAG | TRANS_TYPE | PROCESS_CODE |
|----|-----------|-----------|------------|--------------|
| 1  | N         | Y         | I          | Y            |
| 1  | N         | N         | U          | Y            |
| 1  | N         | N         | D          | Y            |

TABLE 36

DP_WIPMASTER_SB after processing SVC_ORDER_HISTORY.

| ID | PREV_FLAG | CURR_FLAG | TRANS_TYPE | PROCESS_CODE |
|----|-----------|-----------|------------|--------------|
| 1  | N         | Y         | U          | S            |

A script runs that sets C_PROCESS_CODE to Y for all DP_WIPMASTER_SB entries that have its CURR_FLAG set to Y.

CASE 9: DP_WIPMASTER records with C_TRANS_TYPE of D/I.
  Set PREV_FLAG to Y on the I record in DP_WIPMASTER.
  Set the C_PROCESS_CODE to Y for the D record in DP_WIPMASTER.
  Find and update the sandbox (_SB) record.
    Update the record if it exists else insert it.
    Set the C_TRANS_TYPE to I in DP_WIPMASTER_SB.
  Insert the record into SVC_ORDER_HISTORY.
    If the record already exists then mark it (DP_WIPMASTER_SB) as an error else insert it.
    Set the C_PROCESS_CODE to S in DP_WIPMASTER_SB.
    Update ORDER_DW_ID with the primary key of the new record in DP_WIPMASTER_SB.

order go into the CUST_PRODUCT_HISTORY table. Products are never changed after the order is closed. A new order must be placed if a customer wants changes to products. This table serves to keep the products while they are pending.

Insert 'I' records 111:
  If the record does NOT exist in DP_WIPCUSRATE_SB then:
    Insert record into DP_WIPCUSTRATE_SB with a C_PROCESS_CODE of 'N'.
    Find the parent of this record in SVC_ORDER_HISTORY using primary keys from DP_WIPCUSTRATE_SB.
    If more than one record is found, use the record with the latest order time.
    Set the SVC_ORDER_DW_ID in DP_WIPCUSTRATE_SB with the primary key of the parent SVC_ORDER_HISTORY record.
    If parent SVC_ORDER_HISTORY can not be found, use the primary key off of the default SVC_ORDER_DW_ID.

TABLE 37

DP_WIPMASTER after preprocessing.

| ID | PREV_FLAG | CURR_FLAG | TRANS_TYPE | PROCESS_CODE |
|---|---|---|---|---|
| 1 | N | N | D | Y |
| 1 | Y | N | I | N |

TABLE 38

DP_WIPMASTER TO DP_WIPMASTER_SB.

| ID | PREV_FLAG | CURR_FLAG | TRANS_TYPE | PROCESS_CODE |
|---|---|---|---|---|
| 1 | Y | N | I | N |

TABLE 39

DP_WIPMASTER after moving to sandbox.

| ID | PREV_FLAG | CURR_FLAG | TRANS_TYPE | PROCESS_CODE |
|---|---|---|---|---|
| 1 | N | N | D | Y |
| 1 | Y | N | I | Y |

TABLE 40

DP_WIPMASTER_SB after processing SVC_ORDER_HISTORY.

| ID | PREV_FLAG | CURR_FLAG | TRANS_TYPE | PROCESS_CODE |
|---|---|---|---|---|
| 1 | Y | N | I | S |

Figure 6:
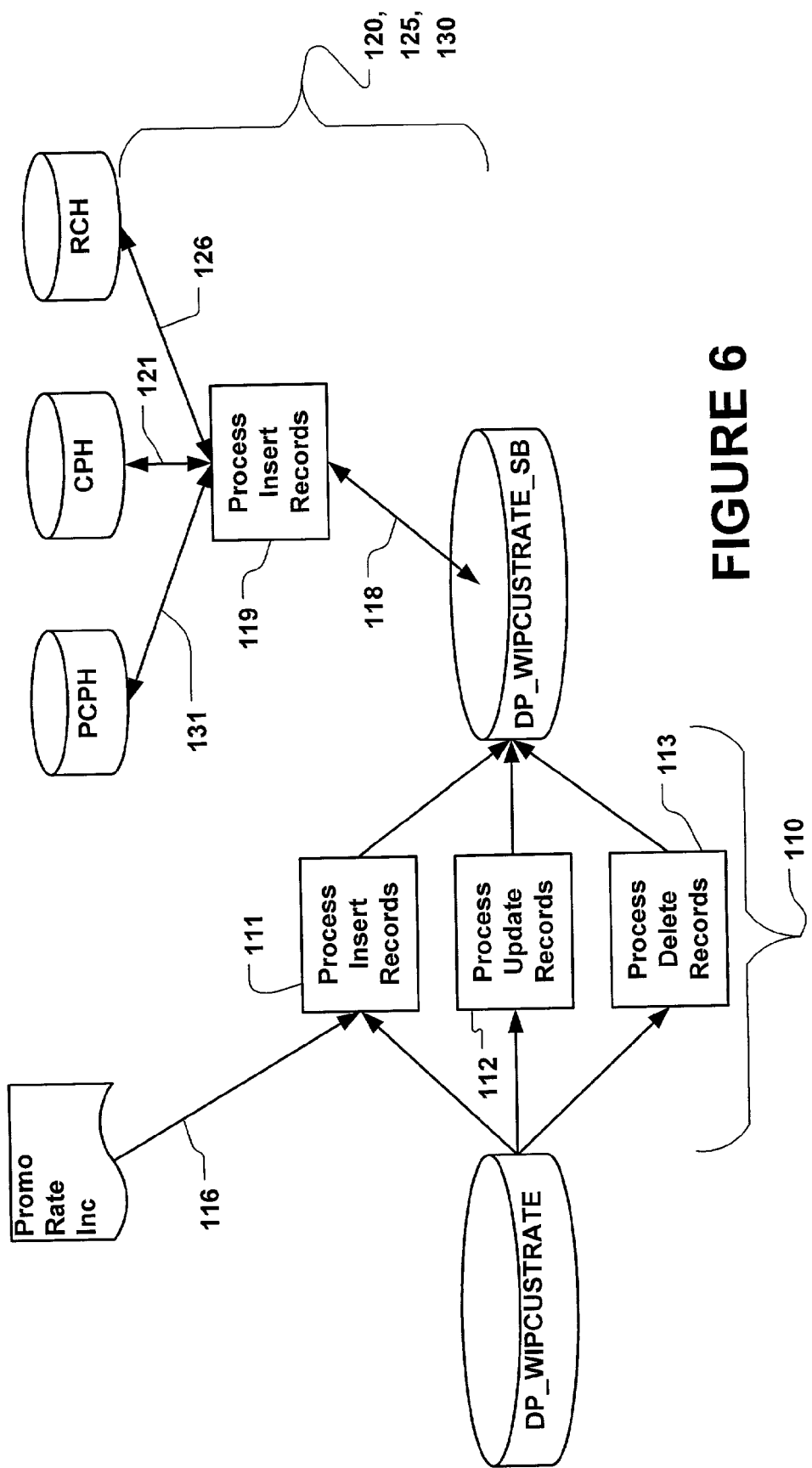
FIG. 6 shows an example of processing records into the product tables and is seen, in a general form, within FIG. 4.

3. Process records from DP_WIPCUSTRATE to DP_WIPCUSTRATE_SB (see FIGS. 4 and 6, elements 110, 111, 112, and 113).

Records are pre-processed and are in DP_WIPCUSTRATE. DP_WIPCUSTRATE_SB is a permanent staging table and holds a record for each current product on an order on the source system. When an order is pending, the products on the order can change. Products for pending orders go into the PEND_PRODUCT_HISTORY table. This table is re-built with the latest snapshot of each order's products. When the order is completed, the products on the If the record does exist then set the DP_WIPCUSTRATE record as an 'E' error else set C_PROCESS_CODE to 'Y'.

Update 'U' records 112:
  If the record does exist in DP_WIPCUSTRATE_SB then:
    Update DP_WIPCUSTRATE_SB and set the C_PROCESS_CODE to 'N'.
  If it does NOT exist then mark the DP_WIPCUSTRATE record as an 'E' error else set C_PROCESS_CODE to 'Y' in DP_WIPCUSTRATE.

Delete 'D' records 113:
   If the record does exist in DP_WIPCUSTRATE_SB then:
      Set the C_PROCESS_CODE to 'Y' in DP_WIPCUSTRATER_SB (will be deleted).
   If the record does NOT exist in DP_WIPCUSTRATE than mark the record as a 'W'.

4. Process records from promotional and rate increase records into DP_WIPCUSTRATE_SB (see FIGS. 4 and 6, elements 115 and 116 via 111).
   Promotions and rate increase records (Promo Rate Inc in FIGS. 4 and 6) originally came from a flat files that were created as a part of batch processing. They are considered to be completed orders. They do not have a parent SVC_ORDER_HISTORY record. They are always considered to be inserts.

Insert 'I' records 116 and 111 (together are 115):
   If the record does NOT exist in DP_WIPCUSRATE_SB then:
      Insert record into DP_WIPCUSTRATE_SB with a C_PROCESS_CODE of 'N'.
      Find the default record in SVC_ORDER_HISTORY. Set the SVC_ORDER_DW_ID in DP_WIPCUSTRATE_SB with the primary key of the default SVC_ORDER_HISTORY record.
   If the record does exist then set the DP_WIPCUSTRATE record as an 'E' error else set C_PROCESS_CODE to 'Y'.

5. Process records from DP_WIPCUSTRATE_SB to CUST_PRODUCT_HISTORY (CPH) (see FIGS. 4 and 6, elements 118, 119, 120, and 121).
   DP_WIPCUSTRATE_SB no longer has the concept of Insert, Updates and Delete. All records are 'adds' to CUST_PRODUCT_HISTORY.
   Process DP_WIPMASTER_SB records that are completed/cancelled (STATUS=5, 6, 7, 8, a, b, c, and d) and the C_PROCESS_CODE for DP_WIPCUSTRATE_SB is 'N'.
   Find the record in CUST_PRODUCT_HISTORY that has an END_DATE=12/31/9999, (open end date) using corp, house, customer, and ratecode (source system primary key) in DP_WIPCUSTRATE_SB.
   If it is found, save off the base charge count and update the END_DATE with Done date of the new order. This 'caps off' the record because there was a change (positive or negative) in this product code for this customer.
   Insert a new record into CUST_PRODUCT_HISTORY for this product using the counts saved from the record capped off plus the counts in the DP_WIPCUSTRATE_SB record. Effective date is the Done date of the new order. End Date is 12/31/9999. This record also has information about the order in which this product code was on.
   This process allows reporting on the exact date a particular product started and stopped. It also tells at any particular date, what is outstanding on a customer's account.
   The CPH jobs will load the record into CUST_PRODUCT_HISTORY and set the C_PROCESS_CODE to 'S'.

6. Process records from DP_WIPCUSTRATE_SB to
   CUST_RPT_CTR_HISTORY (RCH) (see FIGS. 4 and 6, elements 118, 119, 125, and 126). CUST_RPT_CTR_HISTORY works much the same as CUST_PRODUCT_HISTORY. Each product can have from 1 to 20 reporting centers attached to it. Rather than grouping the records by products, by order, they are grouped by reporting center, and by order.
   If an order has an addition of product "x" under report center 12 and a subtraction of product "y" under report 12, the net gain/loss is 0. This takes the noise out of reporting.

The RCH jobs load the records into RPT_CTR_HISTORY and set the C_PROCESS_CODE to 'F' in DP_WIPCUSTRATE_SB.
   DP_WIPMASTER_SB record is completed/cancelled and the C_PROCESS_CODE for DP_WIPCUSTRATE_SB is 'F':
      Set the C_PROCESS_CODE for DP_WIPCUSTRATE to 'Y'.
      Set the C_PROCESS_CODE for DP_WIPMASTER_SB to 'F'.

7. Process records from DP_WIPCUSTRATE_SB to PEND_PRODUCT_HISTORY (see FIGS. 4 and 6, elements 118, 119, 130, and 131).
   Usually, there is a lot of volatility in the data in this table as people can change their minds about the order. This table is dropped and re-built from scratch during each load.
   In DP_WIPCUSTRATE_SB the system no longer has a need for the concept of Insert, Update and Delete. All records are 'adds' to PEND_PRODUCT_HISTORY.
   The subject system processes DP_WIPMASTER_SB records that are completed/cancelled (STATUS=1, 2, 3, and 4) and the C_PROCESS_CODE for DP_WIPCUSTRATE_SB is set to 'N'.
   The subject system finds the record in CUST_PRODUCT_HISTORY that has an END_DATE=12/31/9999, using corp, house, customer, and ratecode in DP_WIPCUSTRATE_SB.
   If it is found, it is saved off the base charge count.
   Insert a new record into PEND_PRODUCT_HISTORY for this product using the counts saved from CUST_PRODUCT_HISTORY plus the counts in the DP_WIPCUSTRATE_SB record. Effective date is the Done date of the new order. End Date is 12/31/9999. This record also has information about the order in which this product code was on.
   This process allows reporting on the exact date a particular product started and stopped. It also tells at any particular date, what pending products are outstanding on a customer's account.
   The CPH jobs will load the record into PEND_PRODUCT_HISTORY and set the C_PROCESS_CODE to still 'N' because these items are not in completed orders.

Figure 7:
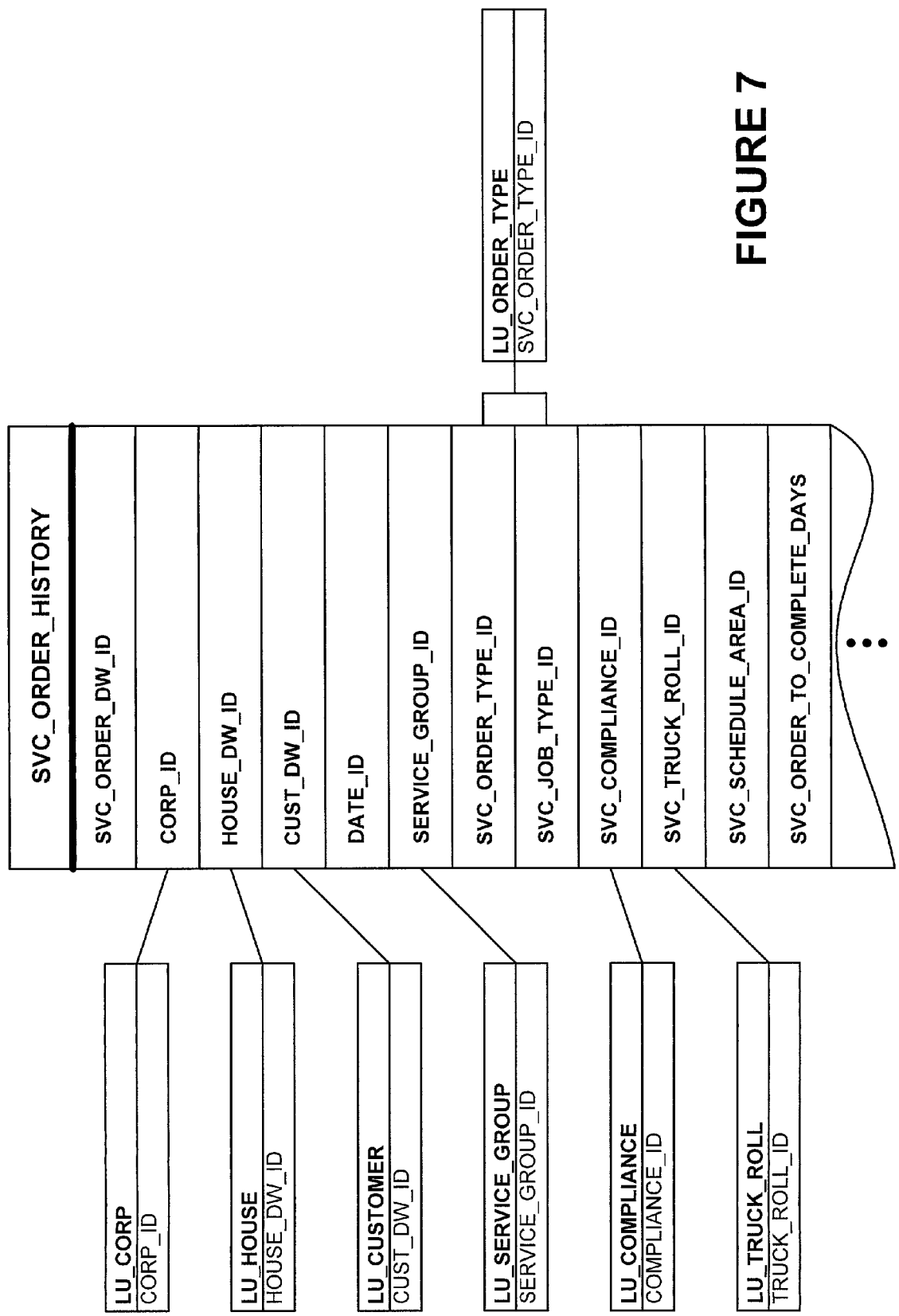
FIG. 7 shows, for the subject invention, the contents of a typical historical data warehouse, in this case, for a service order history dimension in which the relevant fields in the table appear in the center with selected contents displayed to the right and left sides.

Shown in FIG. 7 is an exemplary partial table for the contents of SVC_ORDER_HISTORY which are in subject-oriented data form. The figure illustrates a final output of the transform process of the subject invention in which the data model has a service order history dimension. Clearly, equivalent outputs of subject-oriented data exist for other data models.

The invention has now been explained with reference to specific embodiments. Other embodiments will be suggested to those of ordinary skill in the appropriate art upon review of the present specification. Also, although the foregoing invention has been described in some detail by way of illustration and example for purposes of clarity of understanding, it will be obvious that certain changes and modifications may be practiced within the scope of the appended claims.

What is claimed is:
1. A method used in a computer system for creating from operational data an historical data warehouse containing subject-oriented data, comprising:
   a) obtaining operational data from a source system;
   b) pre-processing said obtained operational data by a stepwise operation, wherein only the last operated upon data is recorded such that data recording is avoided during data addition for efficiency purposes;

c) transforming said pre-processed data into subject-oriented data by utilizing reusable primary keys and Relational Database Management System dates in an operating system of the source system to link related pre-processed data; and d) storing said subject-oriented data in the historical data warehouse;

wherein said dates within said Relational Database Management System in said operating system of said source system are obtained by trigger or log-scraping of said Relational Database Management System;

wherein said pre-processing includes an insert function that returns a warning when associated subject-oriented data already exist in said historical data warehouse;

wherein said Relational Database Management System dates are utilized for distinctly characterizing said subject-oriented data when a plurality of tables containing operational data with duplicate primary keys are combined in said historical data warehouse;

wherein said subject-oriented data is stored in said historical data warehouse with an associated creation data and deletion data derived from said Relational Database Management System dates.

2. A method according to claim 1, further comprising the step of accessing the historical data warehouse by standard viewing means.

3. A method according to claim 1, wherein said historical data warehouse includes a standard set of core reports, components and metadata.

4. A method according to claim 1, wherein said pre-processing includes at least one of an ignore function, an update function, and a replicate function.

5. A method according to claim 4, wherein said replicate function includes a delete function.

6. A method according to claim 4, wherein said pre-processing associated with said update function returns an error when associated subject-oriented data does not exist in said historical data warehouse.

7. A method according to claim 1, wherein said stepwise operation includes performing a function on immediately previous data that is not original data.

8. A method according to claim 1, wherein said related pre-processing data has different descriptions recorded over time.

9. A method according to claim 1, wherein said Relational Database Management System dates are utilized for placing said related pre-processing data of the subject-oriented data in a temporal order.

10. A method used in a computer system for creating from operational data records an historical data warehouse containing related subject-oriented data records, comprising:

a) obtaining operational data records from a source system;

b) pre-processing said obtained operational data records to generate pre-processed data records, wherein said pre-processing comprises operating on each operational data record in a serial manner, adding new data to an immediately prior operated-on record with an entry being recorded only for the last serially operated-on record such that data recording is avoided during data addition for efficiency purposes;

c) transforming said pre-processed data records into related subject-oriented data records, wherein said transforming comprises linking related pre-processed data records together by means of reusable primary keys on said source system and dates within an Relational Database Management System in an operating system of said source system; and d) storing said related subject-oriented data records in the historical data warehouse;

wherein said dates within said Relational Database Management System in said operating systems of said source system are obtained by trigger or log-scraping of said Relational Database Management System;

wherein said pre-processing includes an insert function that returns a warning when associated subject-oriented data already exist said historical data warehouse;

wherein said dates within said Relational Database Management System are utilized for distinctly characterizing said subject-oriented data when a plurality of tables containing operational data with duplicate primary keys are combined in said historical data warehouse;

wherein said subject-oriented data is stored in said historical data warehouse with an associated creation date and deletion date derived from said dates within said Relational Database Management System.

11. A method used in a computer system for creating from operational data records and historical data warehouse containing related subject-oriented data records, comprising:

a) obtaining operational data records from a legacy source system;

b) pre-processing said obtained operational data records to generate pre-processing data records, wherein said pre-processing comprises operating on each operational data record in a stepwise manner, adding new data to an immediately prior operated-on record with an entry being recorded only for the record having the last stepwise operation such that data recording is avoided during data addition for efficiency purposes;

c) transforming said pre-processing data records into related subject-oriented data records, wherein said transforming comprises linking related pre-processed data records together by means of reusable primary keys on said source systems and dates obtained by trigger or log-scraping a Relational Database Management System in an operating systems of said legacy source system;and d) storing said related subject-oriented data records in the historical data warehouse wherein said pre-processing includes an insert function that returns a warning when associated subject-oriented data already exist in said historical data warehouse;

wherein said dates are utilized for distinctly characterizing said subject-oriented data when a plurality of tables containing operation data with duplicate primary keys are combined in said historical data warehouse;

wherein said subject-oriented data is stored in said historical data warehouse with an associated creation date and deletion derived from said dates.

12. A method according to claim 11, further comprising the step of accessing the historical data warehouse by standard viewing means.

13. A computer program embodied on a computer readable storage medium that generates from operational data from a source systems an historical data warehouse containing subject-oriented data, comprising:

a) a preprocessing module, wherein said preprocessing module obtained said operational data by a stepwise operation, wherein only the last operated upon data is recorded such that data recoding is avoided during data addition for efficiency purposes and b) a transforming module, wherein said transforming module transform said preprocessed data into subject-oriented data utilizing reusable primary keys on the source systems and Relational Database Management System dates in an operating system of the source system to link related preprocessed data;

wherein said dates within said Relational Database Management Systems in said operating systems of said source system are obtained by trigger or log-scraping of said Relational Database Management System;

wherein said pre-processing module performs an insert function that returns a warning when associated subject-oriented data already exist in said historical data warehouse;

wherein said Relational Database Management Systems dates are utilized for distinctly characterizing said subject-oriented data when a plurality of tables containing operational data with duplicate primary keys are combined in said historical data warehouse;

wherein said subject-oriented data is stored in said historical data warehouse with an associated creation date and deletion date derived from said Relational Database Systems dates.

14. A computer program according to claim 13, further comprising a storage module for storing said subject-oriented data in an easily accessible format.

15. A computer system used to create from operational data records an historical data warehouse containing related subject-oriented data records, comprising:

a processor;

means for obtaining operational data records from a source computer system;

pre-processing means for pre-processing said obtained operational data records to generate pre-processed data records, wherein said pre-processing means operates on each operational data record in a serial manner, adding new data to an immediately prior operated-on record with an entry being recorded only for the last serially operated-on record such that data recording is avoided during data addition for efficiency purposes;

transforming means for transforming said pre-processed data records into related subject-oriented data records, wherein said transforming means links related pre-processed data records together by means of reusable primary keys on said source computer system and dates within a Relational Database Management System in an operating system of said source computer system; and storage means for storing said related subject-oriented data records in the historical data warehouse;

wherein said dates within said Relational Database Management System in said operating system of said Relational Database Management System;

wherein said pre-processing includes an insert function that returns a warning when associated subject-oriented data already exist in said historical data warehouse;

wherein said dates within said Relational Database Management System are utilized for distinctly characterizing said subject-oriented data when a plurality of tables containing operational data with duplicate primary keys are combined in said historical data warehouse;

wherein said subject-oriented data is stored in said historical data warehouse with an associated creation date and deletion date derived from said dates within said Relational Database Management Systems.

16. A computer system according to claim 15, further comprising means for accessing the historical data warehouse by standard viewing means.

* * * * *